United States Patent
Roeglinger (10) Patent No.: US 11,777,761 B2
(45) Date of Patent: Oct. 3, 2023

(54) CLOUD-BASED SYSTEM FOR MAKING USER DATA AVAILABLE ON ANY PLATFORM DEVICE IN THE CONTEXT OF MEASUREMENT AND CORRESPONDING HANDLING METHOD

(71) Applicant: Rohde & Schwarz GmbH & Co. KG, Munich (DE)

(72) Inventor: Sebastian Roeglinger, Pfaffenhofen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 41 days.

(21) Appl. No.: 16/682,761

(22) Filed: Nov. 13, 2019

(65) Prior Publication Data
US 2020/0396606 A1 Dec. 17, 2020

(30) Foreign Application Priority Data

Jun. 13, 2019 (EP) .................................... 19179849
Jul. 19, 2019 (EP) .................................... 19187201

(51) Int. Cl.
*H04W 12/06* (2021.01)
*G06F 21/40* (2013.01)
*H04L 12/46* (2006.01)
*H04L 41/042* (2022.01)
*H04L 9/40* (2022.01)
*H04L 67/025* (2022.01)
(Continued)

(52) U.S. Cl.
CPC .......... *H04L 12/4675* (2013.01); *G06F 21/40* (2013.01); *G06F 21/629* (2013.01);
(Continued)

(58) Field of Classification Search
CPC ............. H04L 12/4675; H04L 41/0813; H04L 41/0893; H04L 41/22; H04L 43/065;
(Continued)

(56) References Cited

U.S. PATENT DOCUMENTS 10,521,579 B2 * 12/2019 Van Os ................. H04L 9/3231
10,909,582 B1 * 2/2021 Brandt ............... G06Q 30/0279
(Continued)

FOREIGN PATENT DOCUMENTS

BR    200202591 A1    4/2003
DE    10018651 A1    12/2001
EP    1280149 A2     1/2003

OTHER PUBLICATIONS

"Measuring End-to-End Latency of Fingerprint Authenticators"—Rodriguez et al, Technical Disclosure Commons, Dec. 28, 2018 https://core.ac.uk/download/pdf/234668205.pdf (Year: 2018).*
(Continued)

*Primary Examiner* — Randy A Scott
(74) *Attorney, Agent, or Firm* — DITTHAVONG, STEINER & MLOTKOWSKI (57) ABSTRACT

A cloud-based system for making user data available on any platform device in a platform is provided. The cloud-based system comprises a cloud storage, and at least one user profile comprising the user data. In this context, the user data comprises data with respect to at least one measurement device and/or measurement site. Additionally, the at least one user profile is saved on the cloud storage.

16 Claims, 4 Drawing Sheets

(51) Int. Cl.
*G06F 21/62* (2013.01)
*H04L 41/0813* (2022.01)
*H04L 41/0893* (2022.01)
*H04L 41/22* (2022.01)
*H04L 43/065* (2022.01)
*H04L 67/125* (2022.01)

(52) U.S. Cl.
CPC ........ *H04L 41/042* (2013.01); *H04L 41/0813* (2013.01); *H04L 41/0893* (2013.01); *H04L 41/22* (2013.01); *H04L 43/065* (2013.01); *H04L 63/0272* (2013.01); *H04L 63/0869* (2013.01); *H04L 67/025* (2013.01); *H04L 67/125* (2013.01); *H04W 12/06* (2013.01)

(58) Field of Classification Search
CPC . H04L 67/125; H04L 41/042; H04L 63/0272; H04L 63/0869; H04L 67/025; H04L 63/105; H04L 63/10; H04L 63/102; G06F 21/629; G06F 21/40; G06F 21/41; G06F 21/62; H04W 12/06; H04Q 2209/20; H04Q 2209/40; H04Q 2209/86; H04Q 9/00; G08C 17/00
See application file for complete search history.

(56) References Cited

U.S. PATENT DOCUMENTS

| | | |
|---|---|---|
| 2004/0068668 A1 | 4/2004 | Lor et al. |
| 2004/0093495 A1 | 5/2004 | Engel |
| 2005/0228874 A1 | 10/2005 | Edgett et al. |
| 2011/0010701 A1 | 1/2011 | Cooper et al. |
| 2015/0213197 A1* | 7/2015 | Brennan .............. G02B 7/1815 235/375 |
| 2015/0244715 A1* | 8/2015 | Narayan .............. H04W 12/06 726/5 |
| 2016/0019379 A1* | 1/2016 | Sadeh .................. G09B 7/00 434/362 |
| 2016/0232726 A1* | 8/2016 | Zizi .................... G06F 21/35 |
| 2017/0143268 A1* | 5/2017 | Kovacs ................ A61B 5/6887 |
| 2018/0181086 A1* | 6/2018 | Kostyukov ............ G01H 1/00 |

OTHER PUBLICATIONS

"Secure On-Skin Biometric Signal Transmission using Galvanic Coupling"—Tomlinson et al, Public Access Repository, National Science Foundation, Mar. 2019 https://par.nsf.gov/servlets/purl/10130328 (Year: 2019).*

* cited by examiner

CLOUD-BASED SYSTEM FOR MAKING USER DATA AVAILABLE ON ANY PLATFORM DEVICE IN THE CONTEXT OF MEASUREMENT AND CORRESPONDING HANDLING METHOD

PRIORITY

This application claims priority of the European patent applications EP 19 187 201.9 filed on Jul. 19, 2019, and EP 19 179 849.5 filed on Jun. 13, 2019, which are incorporated by reference herewith.

FIELD OF THE INVENTION

The invention relates to a cloud-based system for making user data available on any platform device in a platform and a method for handling such a cloud-based system, wherein the user data comprises data with respect to at least one measurement device and/or measurement site.

BACKGROUND OF THE INVENTION

Generally, in times of an increasing number of measurement devices and measurement sites being distant from one another, there is a growing need of a cloud-based system for making user data available on any platform device in a platform and a method for handling such a cloud-based system, wherein the user data comprises data with respect to at least one measurement device and/or measurement site, in order to ensure highly efficient measurements.

In accordance with DE 100 18 651 A1, mobile radiotelephones which are suitable for data transmission are used for remote-controlling electronic measuring devices whose functions can be regulated through a microprocessor. Said mobile radiotelephones can also be used to remote-transmit the measuring data of the measuring device. Disadvantageously, due to the fact that one measurement device can exclusively be remote-controlled by a mobile radiotelephone, flexibility, and thus also efficiency, are limited.

Accordingly, there is a need to provide a cloud-based system for making user data available on any platform device in a platform and a method for handling such a cloud-based system, wherein the user data comprises data with respect to at least one measurement device and/or measurement site, which allows for both a high flexibility and a high efficiency.

SUMMARY OF THE INVENTION

According to a first aspect of the invention, a cloud-based system for making user data available on any platform device in a platform is provided. The cloud-based system comprises a cloud storage, and at least one user profile comprising the user data. In this context, the user data comprises data with respect to at least one measurement device and/or measurement site. Additionally, the at least one user profile is saved on the cloud storage. Advantageously, for instance, not only a high flexibility but also a high efficiency can be ensured.

According to a first preferred implementation form of the first aspect of the invention, the platform comprises a dashboard, preferably a user dashboard. In this context, the at least one user profile is accessible from the dashboard, preferably the user dashboard. Advantageously, for example, efficiency can further be increased.

According to a second preferred implementation form of the first aspect of the invention, the at least one user profile and/or the user data comprises at least one of settings with respect to the at least one measurement device and/or measurement site, configurations with respect to the at least one measurement device and/or measurement site, waveforms with respect to the at least one measurement device and/or measurement site, test scripts with respect to the at least one measurement device and/or measurement site, or any combination thereof. Advantageously, for instance, flexibility can further be increased, thereby also increasing efficiency.

According to a further preferred implementation form of the first aspect of the invention, the cloud-based system comprises a user secure access system for convenient login to the at least one user profile. Advantageously, for example, security can be increased.

According to a further preferred implementation form of the first aspect of the invention, the user secure access system is configured to make available all user data upon login. Advantageously, for instance, efficiency can further be increased.

According to a further preferred implementation form of the first aspect of the invention, new measurement devices and/or measurement sites and/or personal computers, preferably new third party measurement devices and/or measurement sites and/or personal computers, are not associated with the at least one user profile. Advantageously, for example, inefficiency can be reduced.

According to a further preferred implementation form of the first aspect of the invention, for login to the at least one user profile with the aid of the platform device, the at least one measurement device and/or measurement site is configured to provide a first code for the platform device, and the platform device is configured to provide a second code for the respective at least one measurement device and/or measurement site. Advantageously, for instance, security can further be increased.

According to a further preferred implementation form of the first aspect of the invention, the first code identifies the respective at least one measurement device and/or measurement site. In addition to this or as an alternative, the second code is used for identification with respect to the respective at least one measurement device and/or measurement site. Advantageously, for example, efficiency can further be increased.

According to a further preferred implementation form of the first aspect of the invention, the first code comprises an optical code, preferably a QR (quick response) code. In addition to this or as an alternative, the transmission of the second code is based on a wireless communication, preferably based on a near field communication (NFC). Advantageously, for instance, complexity can be reduced, which leads to an increased efficiency.

According to a further preferred implementation form of the first aspect of the invention, the platform device comprises a locking mechanism, preferably a password-based locking mechanism or a fingerprint-based locking mechanism. Additionally, especially in the case of a login to the at least one user profile with the aid of the platform device, the locking mechanism has to be unlocked for providing the second code. Advantageously, for example, efficiency can further be increased.

According to a further preferred implementation form of the first aspect of the invention, the platform device comprises or is a user equipment, preferably a mobile user equipment, more preferably a mobile phone, most preferably a smartphone. Advantageously, for instance, flexibility can further be increased.

According to a further preferred implementation form of the first aspect of the invention, in the case that a certain measurement device is part of a certain measurement site, all devices being part of the certain measurement site have access to the user data once one of the devices being part of the certain measurement site is granted access. Advantageously, for example, efficiency can further be increased.

According to a further preferred implementation form of the first aspect of the invention, in the case that a certain measurement device is part of a certain measurement site, the cloud-based system is configured to ask a user to confirm if all other devices in the certain measurement site should have access to the user data. Advantageously, for instance, security can further be increased.

According to a further preferred implementation form of the first aspect of the invention, for login to the at least one user profile with the aid of the platform device, the at least one measurement device and/or measurement site comprises a fingerprint scanner or a fingerprint sensor. Advantageously, for example, efficiency can further be increased.

According to a second aspect of the invention, a method for handling a cloud-based system for making user data available on any platform device in a platform is provided. The method comprises the steps of providing at least one user profile comprising the user data, wherein the user data comprises data with respect to at least one measurement device and/or measurement site, and saving the at least one user profile on a cloud storage of the cloud-based system. Advantageously, for instance, not only a high flexibility but also a high efficiency can be ensured.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Figure 1:
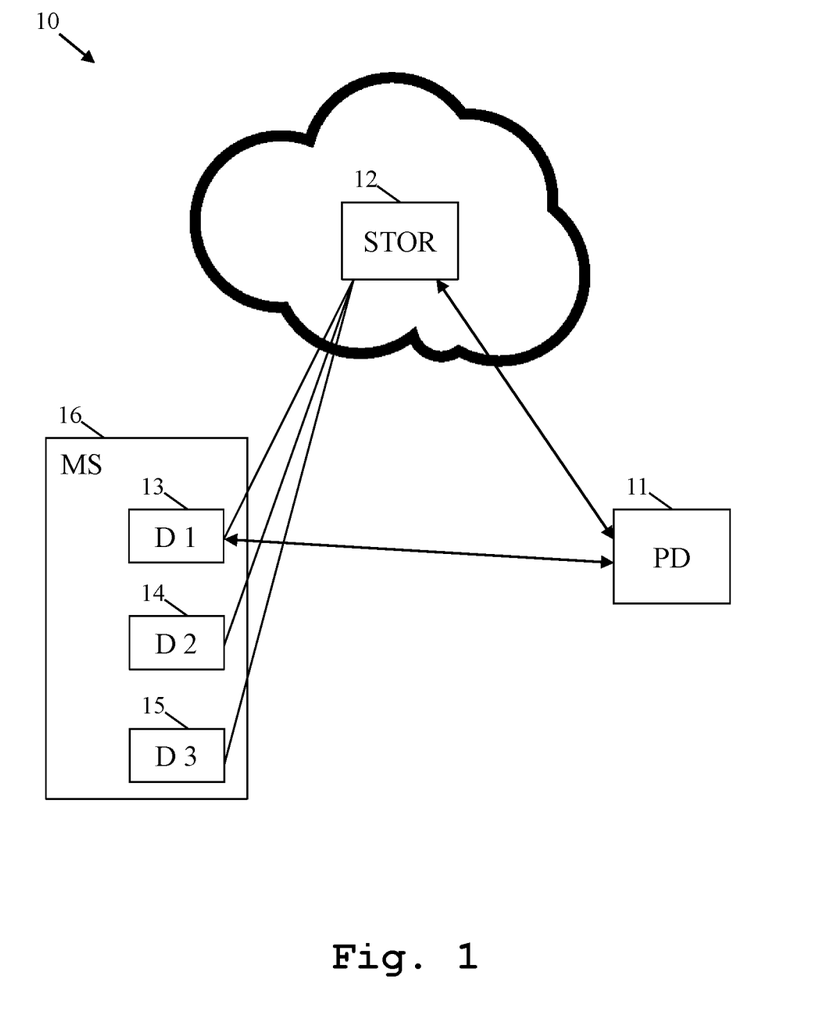
FIG. 1 shows an exemplary embodiment of the first aspect of the invention.

With respect to FIG. 1, a block diagram of an exemplary embodiment of a cloud-based system 10 for making user data available on a platform device 11 in a platform is shown.

According to FIG. 1, the cloud-based system 10 comprises the platform device 11, a cloud storage 12, and a measurement site 16 comprising a first measurement device 13, a second measurement device 14, and a third measurement device 15.

Furthermore, the cloud-based system 10 comprises at least one user profile comprising the user data, wherein the user data comprises data with respect to the measurement devices 13, 14, 15. In this context, the at least one user profile is saved on the cloud storage 12.

It is noted that the platform may especially comprise a dashboard, preferably a user dashboard, wherein the at least one user profile is accessible from the dashboard, preferably from the user dashboard.

With respect to the dashboard, it is noted that the dashboard may especially be a measurement dashboard for a measurement site. In this context, a measurement site may be defined of more than one measurement instrument.

Furthermore, it may be created access on the cloud or cloud service, respectively, to said measurement site, but especially not other measurement sites.

It might be particularly advantageous if said access comprises or is a web-based dashboard allowing restricted access to multiple authenticated users. Said users may be controlled and/or restricted by the respective administrator of the measurement site.

It is noted that in this manner, direct network access to the site is advantageously not required. Further advantageously, a software on a respective remote user's computer may preferably be a password-based web interface for user management.

Moreover, said web-based dashboard may be configured to show at least one of the respective measurement setup, the respective measurement displays, measurement data belonging to the respective measurement site, or any combination thereof.

It is further noted that the at least one user profile and/or the user data may comprise at least one of settings with respect to the measurement devices 13, 14, 15, configurations with respect to the measurement devices 13, 14, 15, wave-forms with respect to the measurement devices 13, 14, 15, test scripts with respect to the measurement devices 13, 14, 15, or any combination thereof.

In addition to this or as an alternative, the at least one user profile and/or the user data may comprise at least one of settings with respect to the measurement site 16, configurations with respect to the measurement site 16, wave-forms with respect to the measurement site 16, test scripts with respect to the measurement site 16, or any combination thereof.

It might be particularly advantageous if the cloud-based system 10 further comprises a user secure access system for convenient login to the at least one user profile.

In this context, the user secure access system may especially be configured to make available all user data upon login.

It is noted that it might be particularly advantageous if new measurement devices and/or measurement sites and/or personal computers, preferably new third party measurement devices and/or measurement sites and/or personal computers, are not associated with the at least one user profile.

Moreover, for login to the at least one user profile with the aid of the platform device 11, the at least one of the measurement devices 13, 14, 15 or the measurement site 16 is configured to provide a first code for the platform device 11, and the platform device 11 is configured to provide a second code for the respective one of the measurement devices 13, 14, 15 or the measurement site 16.

In this context, the first code identifies the respective one of the measurement devices 13, 14, 15 or the measurement site 16. Additionally, the second code is used for identification with respect to the respective one of the measurement devices 13, 14, 15 or the measurement site 16.

It is further noted that the first code comprises an optical code, preferably a QR code. In addition to this, the transmission of the second code is based on a wireless communication, preferably based on a near field communication.

Accordingly, the respective one of the measurement device 13, 14, 15 or the measurement site 16 is configured to display the first code, especially a QR code. Then, the first code is scanned with the aid of the platform device 11.

Afterwards, the platform device 11 uses a wireless communication, especially a near field communication, for identification with respect to the respective one of the measurement devices 13, 14, 15 or the measurement site 16.

Alternatively, especially in the case that the respective one of the measurement devices 13, 14, 15 or the measurement site 16 is configured to scan an optical code, preferably a QR code, the platform device 11 may display the second code in the form of an optical code, preferably in the form of a QR code, for identification with respect to the respective one of the measurement device 13, 14, 15 or the measurement site 16.

It is noted that it might be particularly advantageous if the platform device 11 comprises a locking mechanism, preferably a password-based locking mechanism or a fingerprint-based locking mechanism.

Furthermore, in the case of a login to the at least one user profile with the aid of the platform device 11, the locking mechanism has to be unlocked for providing the second code. Thus, the platform device 11 allows for user identification.

With respect to the platform device 11, it is noted that the platform device 11 may especially comprise or be a user equipment, preferably a mobile user equipment, more preferably a mobile phone, most preferably a smartphone.

It is noted that it might be particularly advantageous if in the case that a certain measurement device is part of a certain measurement site, all devices being part of the certain measurement site have access to the user data once one of the devices being part of the certain measurement site is granted access.

It is further noted that it might be particularly advantageous if in the case that a certain measurement device is part of a certain measurement site, the cloud-based system 10 is configured to ask a user to confirm if all other devices in the certain measurement site should have access to the user data.

Moreover, for login to the at least one user profile with the aid of the platform device 11, at least one of the measurement devices 13, 14, 15 or the measurement site 16 may especially comprise a fingerprint scanner or a fingerprint sensor.

With respect to the first aspect of the invention, it is generally noted that it might be particularly advantageous to provide a cloud-based measurement platform for identifying a device, especially a measurement device or a platform device, a connecting the device with a device profile in a measurement site.

Said cloud-based measurement platform may comprise at least one measurement site comprising at least one device profile, especially at least one measurement device profile. The device profile may comprise at least configurations and/or settings. Additionally or alternatively, the device profile may comprise particular data, waveforms, scripts, saved settings, current configuration, or any combination thereof. Furthermore, the device may comprise or be a signal analyzer or a signal generator.

Moreover, the cloud-based measurement platform may comprise a device to be associated with the at least one measurement site.

The respective cloud or a cloud service, respectively, of the cloud-based measurement platform may especially be configured to authenticate devices, wherein the respective authentication preferably links the respective device with the corresponding measurement site and the profile of the respective device in the corresponding measurement site. In this context, especially with respect to said authentication, an optical code, preferably a QR code, may be scanned. Additionally or alternatively, a dongle, preferably an USB (Universal Serial Bus) dongle, may provide the respective key especially for said authentication.

With respect to the device, it is noted that the device may be configured to communicate with the cloud or the cloud service, respectively. In this context, the cloud or the cloud service, respectively, may be configured to provide the desired or correct device profile, especially measurement device profile.

With respect to the above-mentioned authentication, it is noted that the authentication may be mediated by a smartphone application in combination with at least one optical code such as an QR code generated by the respective device or measurement site.

In addition to this or as an alternative, the authentication may comprise questioning the respective user which profile, especially measurement profile, should be used for the respective device to be connected or associated or a new profile should be generated.

Further additionally or further alternatively, the authentication may comprise using the type of the respective device to suggest possible profiles, especially measurement profiles, for the device to be connected or associated.

Again, with respect to the dongle, preferably the USB dongle, it is noted that the dongle may be configured to provide the respective key for the corresponding measurement site and/or for a particular profile, preferably a particular measurement profile, within the corresponding measurement site.

Figure 2:
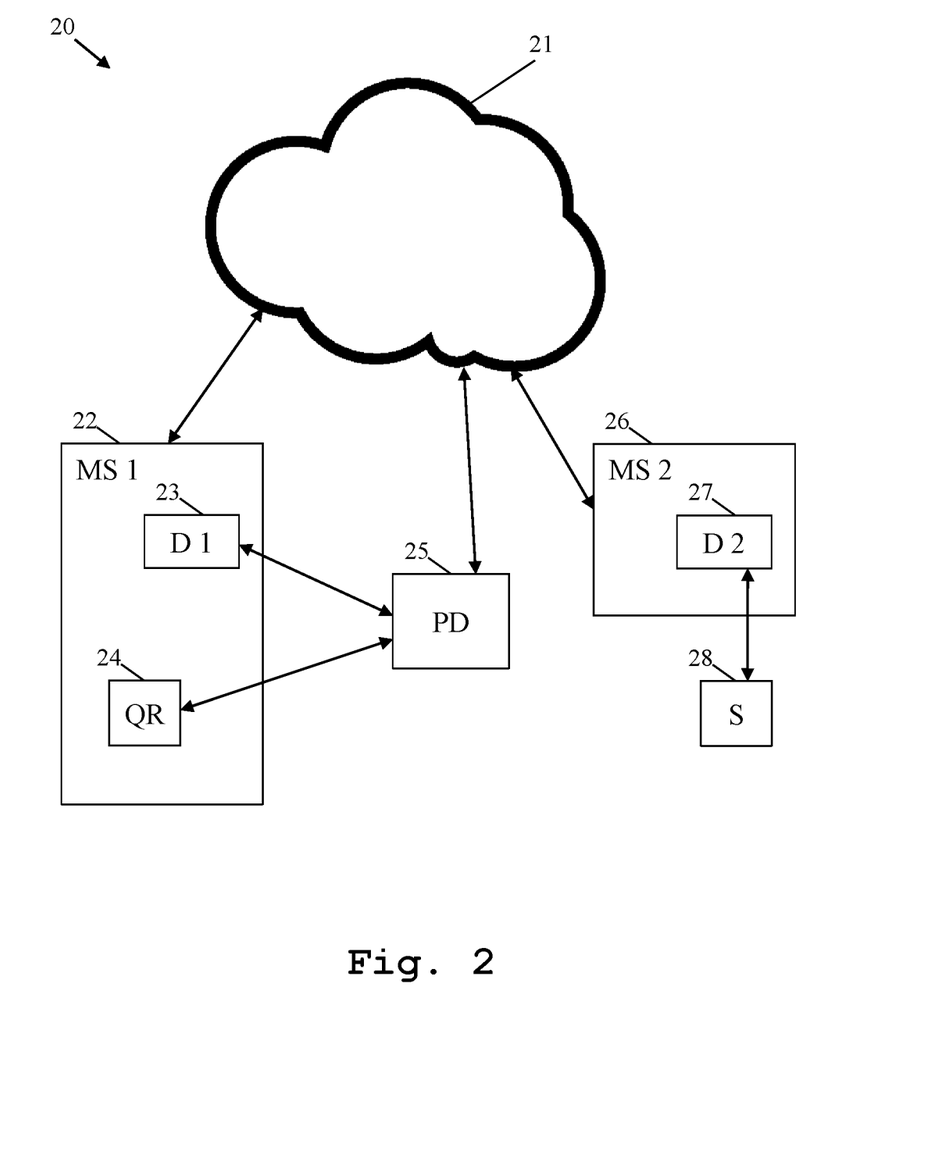
FIG. 2 shows a further exemplary embodiment with respect to the first aspect of the invention.

Now, with respect to FIG. 2, an exemplary embodiment of a cloud-based measurement platform 20 for the first aspect of the invention is shown.

According to FIG. 2, the cloud-based measurement platform 20 comprises a cloud service 21, a first measurement site 22 comprising a first measurement device 23 and a QR code 24, a platform device 25, preferably a mobile device, more preferably a mobile phone, most preferably a smartphone, a second measurement site 26 comprising a second measurement device 27, and a dongle 28 preferably in the form of an USB stick.

In a first use case of identifying a device, especially a measurement device such as the device 23, with respect to a measurement site such as the measurement site 22, the platform device 25 may be configured to scan an optical code such as the QR code 24 of the measurement site 22 or of the device 23. In this context, said optical code may be a printed code or a code displayed on a display of the measurement site 22 or of the device 23, respectively. In addition to this, the platform device 25 may be configured to synchronize with the cloud service 21.

Additionally or alternatively, in a second use case of identifying a device, especially a measurement device such as the device 23, with respect to a measurement site such as the measurement site 22, the platform device 25 may be configured to use a wireless communication technique such as NFC with respect to the measurement site 22 or the device 23 and to synchronize with the cloud service 21.

Furthermore, in a third use case of identifying a device, especially a measurement device such as the device 27, with respect to a measurement site such as the measurement site 26, an USB stick or dongle, respectively, such as the USB stick 28 is provided for the measurement site 26. In this context, the device 27 is configured to read the USB stick and to connect itself with the respective cloud measurement site especially on the basis of the information and/or key read from the USB stick 28.

Figure 3:
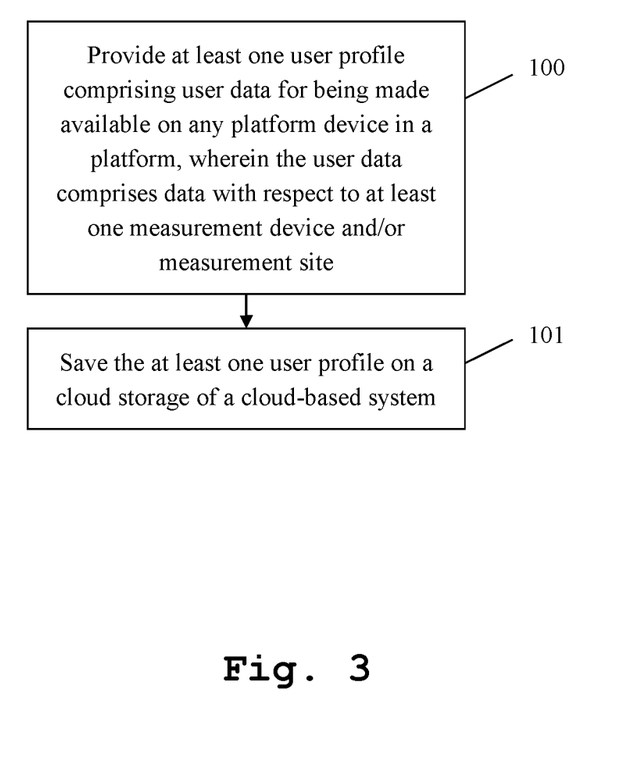
FIG. 3 shows a flow chart of an embodiment of the second aspect of the invention.

Finally, FIG. 3 shows a flow chart of an embodiment of the inventive method for handling a cloud-based system for making user data available on any platform device in a platform. In a first step 100, at least one user profile comprising the user data is provided, wherein the user data comprises data with respect to at least one measurement device and/or measurement site. Then, in a second step 101, the at least one user profile is saved on a cloud storage of the cloud-based system.

In this context, it might be particularly advantageous if the platform comprises a dashboard, preferably a user dashboard, wherein the at least one user profile is accessible from the dashboard, preferably the user dashboard.

Figure 4:
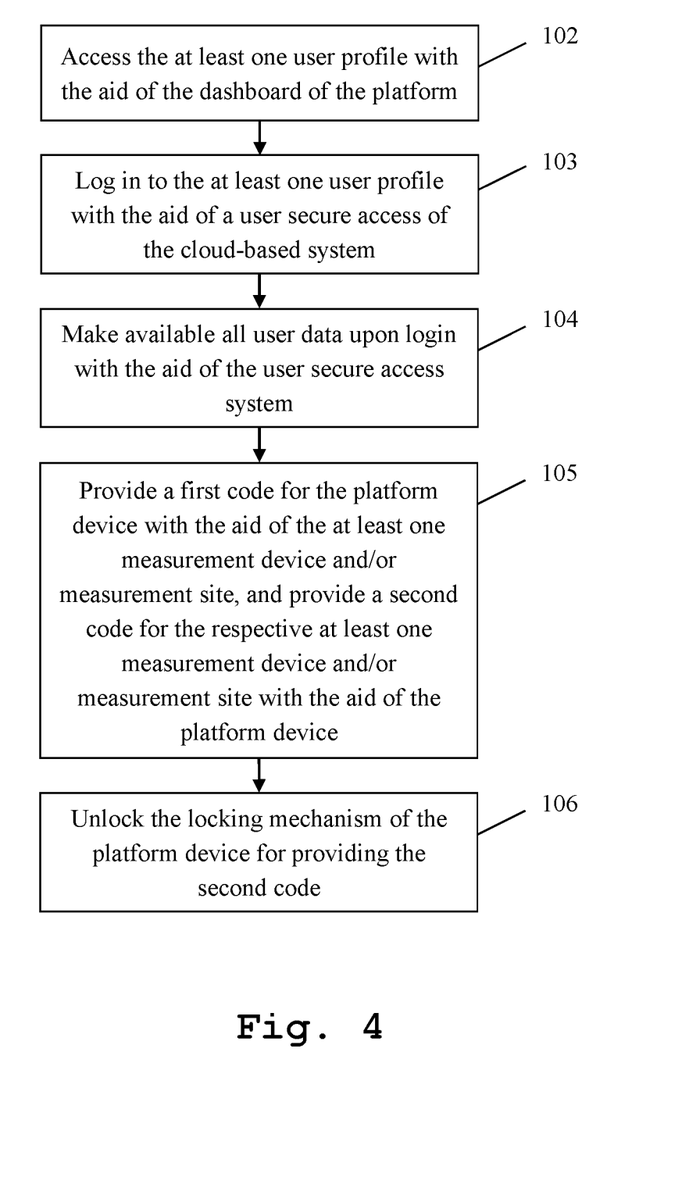
FIG. 4 shows a flow chart of a further embodiment of the second aspect of the invention.

In other words, in accordance with FIG. 4, the method may comprise the step of accessing the at least one user profile with the aid of the dashboard of the platform.

It is further noted that the at least one user profile and/or the user data may especially comprise at least one of settings with respect to the at least one measurement device and/or measurement site, configurations with respect to the at least one measurement device and/or measurement site, waveforms with respect to the at least one measurement device and/or measurement site, test scripts with respect to the at least one measurement device and/or measurement site, or any combination thereof.

Furthermore, the cloud-based system may especially comprise a user secure access system for convenient login to the at least one user profile.

In other words, the method may further comprise the step of logging in to the at least one user profile with the aid of a user secure access of the cloud-based system.

Moreover, the user secure access system may be configured to make available all user data upon login. In other words, the method may further comprise the step of making available all user data upon login with the aid of the user secure access system.

It is noted that it might be particularly advantageous if new measurement devices and/or measurement sites and/or personal computers, preferably new third party measurement devices and/or measurement sites and/or personal computers, are not associated with the at least one user profile.

It is further noted that especially for login to the at least one user profile with the aid of the platform device, the at least one measurement device and/or measurement site may be configured to provide a first code for the platform device, and the platform device may be configured to provide a second code for the respective at least one measurement device and/or measurement site.

In other words, the method may further comprise the steps of providing a first code for the platform device with the aid of the at least one measurement device and/or measurement site, and providing a second code for the respective at least one measurement device and/or measurement site with the aid of the platform device.

In this context, the first code may identify the respective at least one measurement device and/or measurement site. In addition to this or as an alternative, the second code may be used for identification with respect to the respective at least one measurement device and/or measurement site.

Furthermore, the first code may especially comprise an optical code, preferably a QR code. Additionally or alternatively, the transmission of the second code may especially be based on a wireless communication, preferably based on a near field communication.

It is further noted that the platform device may especially comprise a locking mechanism, preferably a password-based locking mechanism or a fingerprint-based locking mechanism, wherein, especially in the case of a login to the at least one user profile with the aid of the platform device, the locking mechanism has to be unlocked for providing the second code.

In other words, also in accordance with FIG. 4, the method may further comprise the step of unlocking the locking mechanism of the platform device for providing the second code.

With respect to the platform device, it is noted that the platform device may especially comprise or be a user equipment, preferably a mobile user equipment, more preferably a mobile phone, most preferably a smartphone.

Moreover, it might be particularly advantageous if especially in the case that a certain measurement device is part of a certain measurement site, all devices being part of the certain measurement site have access to the user data once one of the devices being part of the certain measurement site is granted access.

It is further noted that it might be particularly advantageous if especially in the case that a certain measurement device is part of a certain measurement site, the cloud-based system is configured to ask a user to confirm if all other devices in the certain measurement site should have access to the user data.

Furthermore, especially for login to the at least one user profile with the aid of the platform device, the at least one measurement device and/or measurement site may comprise a fingerprint scanner or a fingerprint sensor.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed:

1. A cloud-based system for making user data available on any platform device in a platform, the cloud-based system comprising:
   a cloud storage,
   at least one platform device,
   at least one measurement device and/or at least one measurement site, and
   at least one user profile comprising the user data, wherein the user data comprises data with respect to a granted access of the at least one measurement device to the at least one measurement site, and wherein the at least one user profile is saved on the cloud storage, wherein login to the at least one user profile with the aid of the at least one platform device and at least one measurement site is configured to provide a first code for the at least one platform device, wherein new measurement devices and/or measurement sites and/or personal computers are associated with the at least one user profile only after authentication, wherein the at least one measurement device comprises at least one of: an oscilloscope, a signal analyzer, a network analyzer, or a signal generator, wherein the at least one measurement site comprises a measurement instrument, wherein the at least one user profile and/or the user data comprises at least a current configuration of the at least one measurement device and measurement site, and wherein for login to the at least one user profile with the aid of the at least one platform device, the at least one measurement device is configured to provide the first code for the at least one platform device that identifies the respective at least one measurement device and/or measurement site, and the at least one platform device is configured to provide a second code for the respective at least one measurement device upon unlocking a locking mechanism of the at least one platform device.

2. The cloud-based system according to claim 1, wherein the platform comprises a dashboard, preferably a user dashboard, wherein the at least one user profile is accessible from the dashboard, preferably the user dashboard.

3. The cloud-based system according to claim 1, wherein the at least one user profile and/or the user data comprises at least one of settings with respect to the at least one measurement device and/or measurement site, wave-forms with respect to the at least one measurement device and/or measurement site, test scripts with respect to the at least one measurement device and/or measurement site, or any combination thereof.

4. The cloud-based system according to claim 1, wherein the cloud-based system comprises a user secure access system for convenient login to the at least one user profile.

5. The cloud-based system according to claim 4, wherein the user secure access system is configured to make available all user data upon login.

6. The cloud-based system according to claim 1, wherein new measurement devices and/or measurement sites and/or personal computers, are not associated with the at least one user profile.

7. The cloud-based system according to claim 1, wherein the first code identifies the respective at least one measurement device and/or measurement site, and/or wherein the second code is used for identification with respect to the respective at least one measurement device and/or measurement site.

8. The cloud-based system according to claim 1, wherein the first code comprises an optical code, and/or wherein the transmission of the second code is based on a wireless communication.

9. The cloud-based system according to claim 1, wherein the at least one platform device comprises a locking mechanism selected from a password-based locking mechanism or a fingerprint-based locking mechanism.

10. The cloud-based system according to any claim 1, wherein the at least one platform device comprises user equipment selected from a mobile phone or a smartphone.

11. The cloud-based system according to claim 1, wherein in the case that a certain measurement device is part of a certain measurement site, all devices being part of the certain measurement site have access to the user data once one of the devices being part of the certain measurement site is granted access.

12. The cloud-based system according to claim 1, wherein in the case that a certain measurement device is part of a certain measurement site, the cloud-based system is configured to ask a user to confirm if all other devices in the certain measurement site should have access to the user data.

13. The cloud-based system according to claim 1, wherein for login to the at least one user profile with the aid of the at least one platform device, the at least one measurement device and/or measurement site comprises a fingerprint scanner or a fingerprint sensor.

14. A method for handling a cloud-based system for making user data available on any platform device in a platform, the method comprising the steps of:

providing at least one user profile comprising the user data, wherein the user data comprises data with respect to a granted access of at least one measurement device to the at least one measurement site, saving the at least one user profile on a cloud storage of the cloud-based system, and providing a first code for at least one platform device with the aid of at least one measurement site, wherein new measurement devices and/or measurement sites and/or personal computers are associated with the at least one user profile only after authentication, wherein the at least one measurement device comprises at least one of: an oscilloscope, a signal analyzer, a network analyzer, or a signal generator, wherein the at least one measurement site comprises a measurement instrument, wherein the at least one user profile and/or the user data comprises at least a current configuration of the at least one measurement device and measurement site, and wherein for login to the at least one user profile with the aid of the at least one platform device, the at least one measurement device is configured to provide the first code for the at least one platform device that identifies the respective at least one measurement device and/or measurement site, and the at least one platform device is configured to provide a second code for the respective at least one measurement device upon unlocking a locking mechanism of the at least one platform device.

15. The method according to claim 14, whereby providing a second code for the respective at least one measurement site with the aid of the at least one platform device.

16. A cloud-based system for making user data available on any platform device in a platform, the cloud-based system comprising:

a cloud storage, at least one platform device, at least one measurement device and/or at least one measurement site, and at least one user profile comprising the user data, wherein the user data comprises wave-form data with respect to a granted access of the at least one measurement device to the at least one measurement site, wherein the at least one user profile is saved on the cloud storage, wherein login to the at least one user profile with the aid of the at least one platform device and at least one measurement site is configured to provide a first code for the at least one platform device, wherein new measurement devices and/or measurement sites and/or personal computers are associated with the at least one user profile only after authentication, wherein the at least one measurement device comprises at least one of: an oscilloscope, a signal analyzer, a network analyzer, or a signal generator, wherein the at least one measurement site comprises a measurement instrument, wherein the at least one user profile and/or the user data comprises at least a current configuration of the at least one measurement device and measurement site, and wherein for login to the at least one user profile with the aid of the at least one platform device, the at least one measurement device is configured to provide the first code for the at least one platform device that identifies the respective at least one measurement device and/or measurement site, and the at least one platform device is configured to provide a second code for the respective at least one measurement device upon unlocking a locking mechanism of the at least one platform device.

* * * * *